United States Patent
Sakaguchi et al.

(10) Patent No.: US 7,673,668 B2
(45) Date of Patent: Mar. 9, 2010

(54) SPHERICAL CASTING SAND

(75) Inventors: Mikio Sakaguchi, Wakayama (JP);
Shigeo Nakai, Toyohashi (JP);
Kazuhiko Kiuchi, Tokyo (JP); Akira Doi, Nogoya (JP)

(73) Assignee: Kao Corporation, Tokyo (JP)

(*) Notice: Subject to any disclaimer, the term of this patent is extended or adjusted under 35 U.S.C. 154(b) by 355 days.

(21) Appl. No.: 10/537,833

(22) PCT Filed: Dec. 9, 2003

(86) PCT No.: PCT/JP03/15704
§ 371 (c)(1),
(2), (4) Date: Jun. 8, 2005

(87) PCT Pub. No.: WO2004/052572
PCT Pub. Date: Jun. 24, 2004

(65) Prior Publication Data
US 2006/0005937 A1  Jan. 12, 2006

(30) Foreign Application Priority Data
Dec. 9, 2002 (JP) .............................. 2002-357344

(51) Int. Cl.
*B22C 1/00* (2006.01)
*B22C 9/02* (2006.01)
(52) U.S. Cl. ................... 164/15; 164/529; 164/349
(58) Field of Classification Search ............... 164/15, 164/349, 529; 501/54, 55, 69, 72
See application file for complete search history.

(56) References Cited
U.S. PATENT DOCUMENTS
4,923,520 A * 5/1990 Anzai et al. ................. 106/490
6,054,073 A * 4/2000 Kobayashi et al. ............ 264/15

FOREIGN PATENT DOCUMENTS

| GB | 1327616 A | 8/1973 |
|----|-----------|--------|
| JP | 3-47943 B | 7/1991 |
| JP | 4-40095 B2 | 7/1992 |
| JP | 4-220134 A | 8/1992 |
| JP | 4-367349 A | 12/1992 |
| JP | 5-169184 A * | 7/1993 |
| JP | 7-48118 A | 2/1995 |
| JP | 8-90150 A * | 4/1996 |
| JP | 08090150 * | 4/1996 |

(Continued)

OTHER PUBLICATIONS

Imono, The Journal of the Japan Foundrymen's Society, vol. 64, No. 8, pp. 562-567 (1992), and the English translation of the publication "Application of Mullite Ceramic Beads to Mold Sand" (references CA and CB of Dec. 23, 2008 IDS).*

(Continued)

*Primary Examiner*—Kevin P Kerns
(74) *Attorney, Agent, or Firm*—Birch, Stewart, Kolasch & Birch, LLP.

(57) ABSTRACT

Molding sand having a high spherical degree and a low hygroscopicity produced from powder containing $Al_2O_3$ and $SiO_2$, as main components by a flame fusion method, from which a mold having an excellent strength and a smooth surface is produced.

12 Claims, 3 Drawing Sheets

←——→
300 μm

FOREIGN PATENT DOCUMENTS

| | | | |
|---|---|---|---|
| JP | 9-47840 | A | 2/1997 |
| JP | 11-132421 | A | 5/1999 |
| JP | 11-188454 | A | 7/1999 |
| JP | 2001-71094 | A | 3/2001 |
| JP | 2001-150095 | A | 6/2001 |
| JP | 2001-286977 | A | 10/2001 |
| JP | 2003-251434 | A | 9/2003 |

OTHER PUBLICATIONS

English language abstract of JP 2003-251434 A (Sep. 9, 2003).
English language abstract of JP 2001-286977 A (Oct. 16, 2001).
English language abstract of JP 61063333 A (Apr. 1, 1986).
English language abstract of JP 5-169184 A (Jul. 9, 1993).
Imono, The Journal of the Japan Foundrymen's Society, vol. 64, No. 8, pp. 562-567, (1992).
Extract translation of technical report, "Application of Mullite Ceramic Beads to Mold Sand" (5 pages).
Akira Takahashi, "Report on Particle Shape Analysis Using Binary Image Analysis," pp. 1-3, (2008).
Hiroshi Kamino, "Difference Between Water Absorptions of Spherical Particles Tested by Two Different Testing Methods", May 22, 2009.
European Patent Office, Notice of Opposition issued in European Application No. 03777375.9 dated Jun. 29, 2009, 6 pgs.

* cited by examiner

←→
300 μm $300 \mu m$

SPHERICAL CASTING SAND

FIELD OF THE INVENTION

The present invention relates to spherical molding sand which can be used for a mold for casting cast steels, cast iron, aluminum, copper and alloys thereof, a process for producing the same, and a casting mold.

BACKGROUND OF THE INVENTION

Conventionally, silica sand has been widely used as molding sand. Because the silica sand is a mineral product, it is amorphous in its form, less in fluidity, and poor in filling ability. Therefore, the surface of a mold made of silica sand is rough, which therefore results in a rough surface of cast products (castings) and heavy load on the polishing step, a post-treatment step. In addition, quartz as a mineral component of the silica sand transforms its crystal structure to cristobalite or the like by thermal load during the casting, and degraded due to its volume change at this time, so that the silica sand is low in its regeneration efficiency. As a means for solving these problems, spherical molding sand (see, for example, JP-A-Hei-4-367349) and high silica-based spherical molding sand and a process for producing the same (see, for example, JP-A-Hei-5-169184) are disclosed. These molding sands are those prepared by forming raw material compositions into a spherical form by granulation, and thereafter baking in a rotary kiln or the like. However, the resultant molding sands are so low in spherical degree that fluidity and filling ability are insufficient and an effect of improving roughness of the surface of castings is small. Moreover, due to production by sintering method, only porous substances, in which many open pores are present and the water absorption is large, are obtained. Consequently, the strength of molds is insufficient, or a large amount of binder is required to produce molds, which makes the regeneration of molding sand difficult.

SUMMARY OF THE INVENTION

The present invention provides spherical molding sand produced by a flame fusion method, wherein the spherical molding sand contains as major components $Al_2O_3$ and $SiO_2$ and has an $Al_2O_3/SiO_2$ weight ratio of 1 to 15 and an average particle size of 0.05 to 1.5 mm. Also, the present invention provides spherical molding sand containing as major components $Al_2O_3$ and $SiO_2$ and having an $Al_2O_3/SiO_2$ weight ratio of 1 to 15, an average particle size of 0.05 to 1.5 mm, and a spherical degree of at least 0.95. Further, the present invention provides a process for producing the above-mentioned spherical molding sand, including the step of fusing in flame powdery particles containing as major components $Al_2O_3$ and $SiO_2$, and having an $Al_2O_3/SiO_2$ weight ratio of 0.9 to 17 and an average particle size of 0.05 to 2 mm, to form spherical particles. Moreover, the present invention provides a casting mold containing the above-mentioned spherical molding sand.

DETAILED DESCRIPTION OF THE INVENTION

Figure 1:
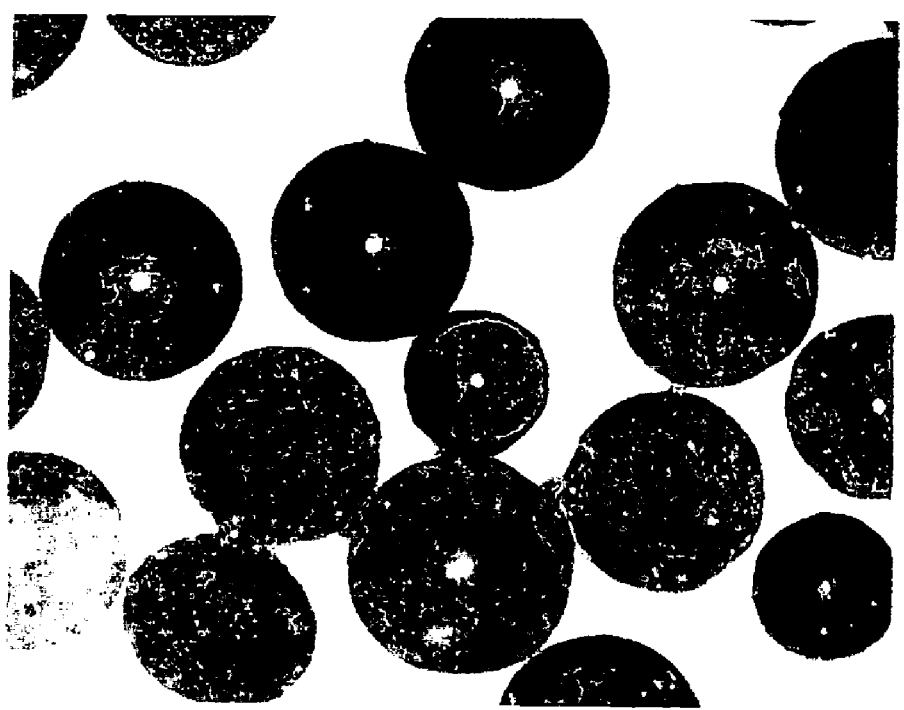
FIG. 1 is a photograph of the molding sand obtained in Example 1, taken by the reflecting microscope (magnification: 100).

The present invention provides spherical molding sand which is excellent in fluidity and can provide a casting mold having a high strength and a smooth face; a process for producing the same; and the casting mold.

The present inventors have found that a refractory particle having specific components and a specific particle size, a large spherical degree, and further having a low water absorption, exhibits excellent properties as a molding sand, and have completed the present invention.

Therefore, the spherical molding sand of the present invention is excellent in fluidity, and a casting mold having a high strength and a smooth surface can be obtained from the molding sand.

The spherical molding sand of the present invention includes two major embodiments. The first embodiment is spherical molding sand produced by a flame fusion method, wherein the spherical molding sand contains as major components $Al_2O_3$ and $SiO_2$, and has an $Al_2O_3/SiO_2$ weight ratio of 1 to 15 and an average particle size of 0.05 to 1.5 mm. The second embodiment is spherical molding sand containing as major components $Al_2O_3$ and $SiO_2$ and having an $Al_2O_3/SiO_2$ weight ratio of 1 to 15, an average particle size of 0.05 to 1.5 mm and a spherical degree of at least 0.95.

One of great characteristics of the spherical molding sand of the present invention resides in that the spherical molding sand has specific components and a specific average particle size, and a large spherical degree. Due to such constitution, it is possible to produce a casting mold having an excellent fluidity, a high strength and a smooth surface. Furthermore, it is possible to produce molds with a less amount of a binder in comparison with conventional methods, and regeneration is easy.

The sphericity which is a shape of the spherical molding sand of the present invention is defined by the spherical degree of at least 0.88, preferably at least 0.90. Whether being spherical or not, can be judged by, for example, observation of molding sands with an optical microscope, a digital scope (for example, manufactured by KEYENCE, VH-8000 type) or the like as described in Examples mentioned later.

The spherical molding sand of the present invention contains $Al_2O_3$ and $SiO_2$ as major components. Here, the "major components" means that $Al_2O_3$ and $SiO_2$ are contained in a total content of at least 80% by weight in the whole components of the whole molding sands.

The total content of $Al_2O_3$ and $SiO_2$, which are major components of the spherical molding sand of the present invention, in the whole components of the spherical molding sand, is preferably 85 to 100% by weight, more preferably 90 to 100%, from the viewpoint of fire-resistant improvement.

Also, the weight ratio of $Al_2O_3/SiO_2$ is 1 to 15. From the viewpoint of improving fire resistance and regeneration efficiency, the weight ratio of $Al_2O_3/SiO_2$ is preferably 1.2 to 12, more preferably 1.5 to 9.

Materials which may be contained in the spherical molding sand of the present invention as components in addition to the major components, include, for example, metal oxides such as CaO, MgO, $Fe_2O_3$, $TiO_2$, $K_2O$ and $Na_2O$. These are derived from, for example, raw materials used as starting materials described later. When CaO and MgO are contained, the total content of these compounds is preferably at most 5% by weight from the viewpoint of improvement in fire-resistance. When $Fe_2O_3$ and $TiO_2$ are contained, the content of each is preferably at most 5% by weight. The content of $Fe_2O_3$ is more preferably at most 2.5% by weight, even more preferably at most 2% by weight. When $K_2O$ and $Na_2O$ are contained, the total content of these compounds is preferably at most 3% by weight, more preferably at most 1% by weight.

The average particle size (mm) of the spherical molding sand of the present invention is within a range of 0.05 to 1.5 mm. When the average particle size is less than 0.05 mm, it is not preferable because a large amount of binder is necessary for producing a mold and it is difficult to regenerate as molding sand. On the other hand, when the average particle size is more than 1.5 mm, it is not preferable because a void ratio of a mold becomes large, leading to decrease in mold strength. From the viewpoint of increase in regeneration efficiency of the spherical molding sand, the average particle size is preferably 0.075 to 1.5 mm. On the other hand, the average particle size is preferably 0.05 to 1 mm from the viewpoint of improvement in mold strength. From the viewpoint of improvement in both of regeneration efficiency and mold strength, the average particle size is more preferably 0.05 to 0.5 mm, even more preferably 0.05 to 0.35 mm. When the spherical molding sand of the present invention is used as facing sand and the like, it is preferable that the average particle size is controlled within a range of 0.01 to 0.1 mm.

The average particle size can be obtained as follows: Specifically, when the spherical degree is 1 according to a particle projected section of a spherical molding sand particle, its diameter (mm) is measured; when the spherical degree is less than 1, the major axis diameter (mm) and minor axis diameter (mm) of a randomly aligned spherical molding sand particle are measured to obtain the value of (major axis diameter+ minor axis diameter)/2; and then the respectively measured values optionally selected from 100 numbers of the spherical molding sand particles, are averaged to obtain an average diameter (mm). The major axis diameter and the minor axis diameter are defined as follows: When a particle is stably placed on a plane and then a projection image thereof on the plane is edged with two parallel lines, the width of the particle which makes distance between the parallel two lines minimum is defined as the minor axis; on the other hand, the distance between another parallel two lines which edges the particle in the direction orthogonally crossing the former parallel two lines is defined as the major axis.

The major axis and the minor axis can be obtained by image analysis on an image (photograph) of the particle taken by an optical microscope or a digital scope (for example, manufactured by KEYENCE, VH-8000 type). The spherical degree is obtained by the following method: The image taken is subjected to image analysis to obtain an area of particle projected section of the particle and a peripheral length thereof, followed by calculation of [peripheral length (mm) of complete round having the same area as the area ($mm^2$) of particle projected section]/[peripheral length (mm) of particle projected section], and then by averaging respectively obtained values selected from optional 50 spherical molding sand particles.

The spherical molding sand of the first embodiment of the present invention is produced by a flame fusion method. Therefore, the spherical molding sand has structural characteristics of high spherical degree and compactness. Such structural characteristics significantly contribute to the improvement in fluidity, mold strength and surface smoothness of castings.

As the spherical molding sand of the first embodiment of the present invention, from the viewpoint of improvement in fluidity, those having a spherical degree of at least 0.95 are preferable, those having a spherical degree of at least 0.98 are more preferable, and those having a spherical degree of at least 0.99 are even more preferable. Therefore, for the spherical molding sand of the first embodiment of the present invention, for example, suitable is spherical molding sand containing as major components $Al_2O_3$ and $SiO_2$ and having an $Al_2O_3/SiO_2$ weight ratio of 1 to 15, an average particle size of 0.05 to 1.5 mm and a spherical degree of at least 0.95.

On the other hand, the spherical degree (sphericity) of the spherical molding sand of the second embodiment of the present invention is at least 0.95. In view of improvement in fluidity, the spherical degree is preferably at least 0.98, more preferably at least 0.99.

The water absorption (% by weight) of the spherical molding sand of the present invention is at most 3% by weight, more preferably at most 0.8% by weight, even more preferably at most 0.3% by weight, from the viewpoint of suppressing the increase in binder amount due to the absorption of a binder used in the production of a mold into molding sands and improving the mold strength. The water absorption can be measured by the water absorption measurement method for fine aggregate of JIS A1109.

When the spherical molding sand is prepared by a flame fusion method, the water absorption of the sand is usually lower than that of the sands prepared by methods other than the flame fusion method under the condition of the same spherical degree.

On the other hand, when the spherical degree of the spherical molding sand of the present invention is at least 0.98, if the spherical molding sand is contained in a content of preferably at least 50% by volume in a mixture of the spherical molding sand and known molding sand having low fluidity such as silica sand, molding sand containing the mixture can satisfactorily exhibit effects desired in the present invention. When the spherical molding sand of the present invention is gradually added to known molding sand as described above, the resulting sand exhibits effects desired in the present invention in accordance with the amount added. When the spherical molding sand having a specified spherical degree described above of the present invention is contained in a content of at least 50% by volume in the molding sands containing the mixture described above, the effect is markedly exhibited. The content of the spherical molding sand having a spherical degree of at least 0.98 of the present invention is more preferably at least 60% by volume, even more preferably at least 80% by volume. Therefore, as the spherical molding sand of the present invention, those having a spherical degree of at least 0.98 are particularly suitable due to excellent usability thereof. Besides, molding sand containing at least 50% by volume of such spherical molding sand is also included in the present invention because the molding sand can exhibit effects equivalent to those of the spherical molding sand of the present invention.

As described above, the spherical molding sand of the first embodiment of the present invention is produced by a flame fusion method. On the other hand, the spherical molding sand of the second embodiment of the present invention can be produced by a known method such as a granulation-sintering method or an electromelted atomizing method. Among them, a flame fusion method is also suitable for this production as well as the spherical molding sand of the first embodiment of the present invention. Therefore, an example of the process for producing the spherical molding sand of the present invention by a flame fusion method is described below. Such method is also included in the present invention.

The process for producing the spherical molding sand of the present invention includes the step of fusing in flame powdery particles containing as major components $Al_2O_3$ and $SiO_2$, and having an $Al_2O_3/SiO_2$ weight ratio of 0.9 to 17 and an average particle size of 0.05 to 2 mm, to form spherical particles.

Here, "containing $Al_2O_3$ and $SiO_2$ as major components" means that $Al_2O_3$ and $SiO_2$ are contained in a content of at least of 80% by weight in the whole components of the whole powdery particles. Therefore, as long as "containing $Al_2O_3$ and $SiO_2$ as major components" is sustained, the powdery particles may be a mixture of a raw material as a source of $Al_2O_3$ and a raw material as a source of $SiO_2$ as described hereinafter; a single raw material as a source of ($Al_2O_3$+ $SiO_2$); or a mixture of a raw material as a source of $Al_2O_3$ and/or a raw material as a source of $SiO_2$ and a raw material as a source of ($Al_2O_3$+$SiO_2$).

In the above-mentioned powdery particles used as the starting material, the total content of $Al_2O_3$ and $SiO_2$ as major components is preferably at least 75% by weight, more preferably at least 80% by weight, even more preferably 85 to 100% by weight, even more preferably 90 to 100% by weight, from the viewpoint of adjusting the total amount of $Al_2O_3$ and $SiO_2$ contained in the resulting spherical molding sand to at least 80% by weight in the whole components. The weight ratio of $Al_2O_3/SiO_2$ is 0.9 to 17, preferably 1 to 15, from the viewpoint of adjusting the weight ratio of $Al_2O_3/SiO_2$ in the spherical molding sand to 1 to 15. The average particle size is at least 0.05 mm from the viewpoint of obtaining monodispersed spherical molding sand, and at most 2 mm from the viewpoint of obtaining spherical molding sand having a desired spherical degree and, from these viewpoints, preferably 0.05 to 2 mm. Furthermore, from the viewpoint of improvement in spherical degree of the resulting molding sand, the average particle size is preferably 0.05 to 1.5 mm. In order to obtain spherical molding sand having an average particle size within a range of 0.01 to 0.1 mm, which are used as facing sand and the like, it is preferable to use a starting material having an average particle size within a range of 0.01 to 0.1 mm.

The reason why the weight ratio of $Al_2O_3/SiO_2$ is different between the raw material powdery particle and the spherical molding sand obtained, is that the lost amounts of $Al_2O_3$ and $SiO_2$ are different depending on the raw material. The average particle size of the raw material powdery particles may be within the range described above because the particle size of originally spherical powders does not change, though the particle size of powders in an amorphous shape is decreased upon transforming to a spherical shape.

In order to obtain the spherical molding sand of the present invention, powdery particles which are used as a raw material are prepared by adjusting the weight ratio of $Al_2O_3/SiO_2$ and the average particle size to be included in the above-mentioned range, respectively, in consideration of evaporation of components during fusing.

When the powdery particles which are used as a starting raw material are fused, if water is contained in the particles, many open pores are formed in the resulting molding sand due to evaporation of the water. The open pore formation causes the increase in water absorption and decrease in spherical degree of the molding sand. Therefore, the water content (% by weight) of the starting raw material is preferably at most 10% by weight, more preferably at most 3% by weight, even more preferably at most 1% by weight, from the viewpoint of adjusting the water absorption and the spherical degree of the resulting spherical molding sand to be included in a suitable range. The water content is measured from the amount of water loss when 10 g of powdery particles are heated at 800° C. for 1 hour.

The starting raw materials can be selected from, for example, mineral products and synthetic products which have fire resistance. Raw materials as a source of $Al_2O_3$ include bauxite, aluminium shale, aluminum oxide, aluminium hydroxide and the like. Also, raw materials as a source of $SiO_2$ include silica rock, silica sand, quartz, cristobalite, amorphous silica, feldspar, pyrophyllite and the like. In addition, raw materials as a source of ($Al_2O_3$+$SiO_2$) include kaolin, aluminium shale, bauxite, mica, sillimanite, andalusite, mullite, zeolite, montmorillonite, halloysite and the like. These raw materials can be used alone or in admixture of at least two kinds. The selected raw materials are preferably calcined for use in order to decrease its water content or to fuse easily. The calcined raw material powdery particles are exemplified by calcined aluminium shale, calcined mullite, calcined bauxite, a mixture of kaolin and calcined aluminium hydroxide, and the like.

In the step for fusing powdery particles which are used as a starting material in flame, to form spherical particles, the starting materials described above are dispersed in a carrier gas such as oxygen, followed by supplying in a flame to fuse to give a spherical form (flame fusion method). In a suitable embodiment, the starting materials are supplied in flame, as described below.

The flame used is generated by burning a fuel such as propane, methane, natural liquified gas, LPG, heavy oil, kerosene, gas oil or powdered coal with oxygen. The ratio of fuel to oxygen is preferably 1.01 to 1.3 in a volume ratio, from the viewpoint of complete combustion. Use of oxygen-gas burner is suitable from the viewpoint of obtaining high temperature flame. The structure of burner is not particularly limited, and exemplified by burners as disclosed in JP-A-Hei-7-48118, JP-A-Hei-11-132421, JP2000-205523 A and JP2000-346318 A.

To make the aforementioned fire-resistant raw powders used for the production process of the present invention in a spherical form, which have a large average particle size within a range of 0.05 to 2 mm, the following procedure is suitable.

Supplying the powdery particles in flame is carried out by dispersing in a carrier gas. Oxygen is suitably used as a carrier gas. In this case, oxygen as a carrier gas has an advantage that it is consumed in burning fuel. A powder concentration in the gas is preferably from 0.1 to 20 kg/Nm$^3$, more preferably from 0.2 to 10 kg/Nm$^3$, from the viewpoint of securing sufficient dispersibility of the powdery particles.

Furthermore, when the powdery particles are supplied to flame, it is preferable to pass through a mesh, a static mixer and the like, to enhance dispersibility.

From the viewpoint of rapidly making a spherical form in flame and obtaining monodispersed spherical molding sand, it is preferable to choose forms and components of the raw material powdery particles. As the form, from the viewpoint of securing retention time and fusing and rapidly making a spherical form in flame, the major axis diameter/minor axis diameter ratio of the raw material powdery particles is preferably at most 9, more preferably at most 4, even more preferably at most 2. On the other hand, as the components, from the viewpoint of obtaining non-fused monodispersed spherical particles, the weight ratio of $Al_2O_3/SiO_2$ is particularly suitably 1.5 to 10.

The powdery particles can be suitably fused and made in a spherical form in a plasma jet flame generated by ionizing $N_2$ inert gas and the like.

According to the process described above, the spherical molding sand as desired in the present invention can be obtained. The molding sand is so excellent in fluidity. Moreover, as aforementioned, by appropriately mixing the spherical molding sand with known molding sand so as to contain the spherical molding sand of the present invention in a specified ratio, there can be obtained molding sand which can exhibit effects equivalent to those of the spherical molding sand of the present invention. When these molding sands are employed in producing a mold, the amount of a binder used can be reduced. Therefore, the molding sand can be effectively regenerated as molding sand.

The spherical molding sand of the present invention as well as a mixture of the molding sand of the present invention and known molding sand (hereinafter referred to as the molding sand of the present invention) can be suitably applied to a mold of cast steels, cast iron, aluminum, copper or alloys thereof; and also used as a filler for metals, plastics and the like.

The molding sand of the present invention is used alone or in combination with known molding sand such as silica sand or a fire-resistant aggregate, and mixed with an inorganic binder such as clay, water glass or silica sol; or an organic binder such as a furan resin, a phenol resin or a furan-phenol resin; and then molded by using a desired casting mold according to a known method. From the viewpoint of obtaining a casting mold having a high strength, the amount of binder used is preferably 0.05 to 5. parts by weight based on 100 parts by weight of the molding sand. The mold thus obtained has a high strength and a smooth surface. Therefore, when casting is carried out by this casting mold, castings of which roughness of the surface is small and load to polishing step as a post-treatment step is light can be obtained.

From the viewpoint of using in production of a casting mold, the particle density (g/cm$^3$) of the molding sand of the present invention is preferably within a range of 1 to 3.5 g/cm$^3$. When a mold having a higher strength is desired, the particle density is preferably within a range of 2.5 to 3.5 g/cm$^3$. The molding sands within these ranges can provide a solid and compact mold having a high strength. Also, when a light-weight mold is desired, the particle density is preferably within a range of 1 to 2.5 g/cm$^3$. The molding sands within this range can provide a porous, light-weight mold having voids therein. The particle density can be measured according to the particle density measurement method of JIS R1620.

Moreover, by further subjecting aforementioned castings to appropriate processing, structures having little defects on its surface and inside thereof can be obtained. The structures include, for example, molds, engine parts, machine tool parts, construction parts and the like.

The spherical molding sand of the present invention is excellent in the properties required for molding sands, and industrially applicable. Furthermore, as described above, casting molds, castings and structures, which have excellent properties, are included in the present invention.

EXAMPLES

Example 1

A mullite powder (synthetic mullite powder manufactured by Shibata Ceramics Co., Ltd.) containing 97% by weight of $Al_2O_3$ and $SiO_2$ in a total amount and having an $Al_2O_3/SiO_2$ weight ratio of 1.7, a water content of 0% by weight, an average particle size of 0.31 mm, and a major axis diameter/minor axis diameter ratio of 1.5 was used as a starting material. This powder was supplied by using oxygen as a carrier gas to flame (about 2000° C.) which was generated by combustion of LPG (propane gas) in a ratio of LPG/oxygen of 1.1 (volume ratio), to give a monodispersed spherical molding sand. The resulting molding sand contained 97% by weight of $Al_2O_3$ and $SiO_2$ in a total amount and had an $Al_2O_3/SiO_2$ weight ratio of 1.7, an average particle size of 0.26 mm, a spherical degree of 0.99, water absorption of 0% by weight, and a particle density of 2.9 g/cm$^3$. A photograph (magnification: 100) of this molding sand, taken by a reflecting microscope (commercially available from NIKON CORPORATION), is shown in FIG. 1. It can be seen from this Figure that every molding sand particle is spherical.

Example 2

The same procedures as in Example 1 were carried out, except that the starting material having an average particle size of 0.9 mm and a major axis diameter/minor axis diameter ratio of 1.7 was used, to give a monodispersed spherical molding sand. The resulting molding sand contained 97% by weight of $Al_2O_3$ and $SiO_2$ in a total amount and had an $Al_2O_3/SiO_2$ weight ratio of 1.7, an average particle size of 0.69 mm, a spherical degree of 0.97, water absorption of 0% by weight, and a particle density of 2.8 g/cm$^3$.

Example 3

The same procedures as in Example 1 were carried out, except that a mullite powder (synthetic mullite powder manufactured by Shibata Ceramics Co., Ltd.) containing 97% by weight of $Al_2O_3$ and $SiO_2$ in a total amount and having an $Al_2O_3/SiO_2$ weight ratio of 2.7, a water content of 0.1% by weight, an average particle size of 0.25 mm, and a major axis diameter/minor axis diameter ratio of 1.3 was used as a starting material, to give a monodispersed spherical molding sand. The resulting molding sand contained 98% by weight of $Al_2O_3$ and $SiO_2$ in a total amount and had an $Al_2O_3/SiO_2$ weight ratio of 2.7, an average particle size of 0.21 mm, a spherical degree of 0.99, water absorption of 0% by weight, and a particle density of 3.1 g/cm$^3$.

Example 4

The same procedures as in Example 1 were carried out, except that sillimanite sand containing 95% by weight of $Al_2O_3$ and $SiO_2$ in a total amount and having an $Al_2O_3/SiO_2$ weight ratio of 1.64, a water content of 0.2% by weight, an average particle size of 0.45 mm, and a major axis diameter/minor axis diameter ratio of 1.6 was used as a starting material, to give a monodispersed spherical molding sand. The resulting molding sand contained 95% by weight of $Al_2O_3$ and $SiO_2$ in a total amount and had an $Al_2O_3/SiO_2$ weight ratio of 1.6, an average particle size of 0.35 mm, a spherical degree of 0.98, water absorption of 0% by weight, and a particle density of 2.8 g/cm$^3$.

Example 5

The same procedures as in Example 1 were carried out, except that powdery particles containing 96% by weight of $Al_2O_3$ and $SiO_2$ in a total amount and having a water content of 1.9% by weight, an average particle size of 0.2 mm, and a major axis diameter/minor axis diameter ratio of 1.8, which were prepared by mixing aluminum hydroxide with kaolin so as to have an $Al_2O_3/SiO_2$ weight ratio of 2.5 and calcinating the mixture in an electric furnace at 700° C. for 1 hour, was used as a starting material, to give a monodispersed spherical molding sand. The resulting molding sand contained 95% by weight of $Al_2O_3$ and $SiO_2$ in a total amount and had an $Al_2O_3/SiO_2$ weight ratio of 2.6, an average particle size of 0.19 mm, a spherical degree of 0.97, water absorption of 0.1% by weight, and a particle density of 2.7 g/cm$^3$.

Example 6

The same procedures as in Example 1 were carried out, using as a starting material a calcined aluminium shale powder containing 93% by weight of $Al_2O_3$ and $SiO_2$ in a total amount and having an $Al_2O_3/SiO_2$ weight ratio of 1.56, a water content of 0.1% by weight, an average particle size of 0.15 mm, and a major axis diameter/minor axis diameter ratio of 1.4, to give a monodispersed spherical molding sand. The resulting molding sand contained 93% by weight of $Al_2O_3$ and $SiO_2$ in a total amount and had an $Al_2O_3/SiO_2$ weight ratio of 1.55, $Fe_2O_3$ content of 1.7% by weight, an average particle size of 0.14 mm, a spherical degree of 0.988, and water absorption of 0% by weight.

Example 7

The same procedures as in Example 1 were carried out, using as a starting material a calcined aluminium shale powder containing 95% by weight of $Al_2O_3$ and $SiO_2$ in a total amount and having an $Al_2O_3/SiO_2$ weight ratio of 3.36, a water content of 0.1% by weight, an average particle size of 0.13 mm, and a major axis diameter/minor axis diameter ratio of 1.2, to give a monodispersed spherical molding sand. The resulting molding sand contained 93% by weight of $Al_2O_3$ and $SiO_2$ in a total amount and had an $Al_2O_3/SiO_2$ weight ratio of 3.35, Fe2O3 content of 1.01% by weight, an average particle size of 0.12 mm, a spherical degree of 0.998, and water absorption of 0% by weight.

Example 8

The same procedures as in Example 1 were carried out, using as a starting material a calcined aluminium shale powder containing 91% by weight of $Al_2O_3$ and $SiO_2$ in a total amount and having an $Al_2O_3/SiO_2$ weight ratio of 9.83, a water content of 0.1% by weight, an average particle size of 0.14 mm, and a major axis diameter/minor axis diameter ratio of 1.3, to give a monodispersed spherical molding sand. The resulting molding sand contained 91.5% by weight of $Al_2O_3$ and $SiO_2$ in a total amount and had an $Al_2O_3/SiO_2$ weight ratio of 9.39, Fe2O3 content of 1.87% by weight, an average particle size of 0.13 mm, a spherical degree of 0.996, and water absorption of 0% by weight.

Example 9

The same procedures as in Example 1 were carried out, using as a starting material a calcined mullite powder containing 95% by weight of $Al_2O_3$ and $SiO_2$ in a total amount and having an $Al_2O_3/SiO_2$ weight ratio of 2.21, a water content of 0% by weight, an average particle size of 0.16 mm, and a major axis diameter/minor axis diameter ratio of 1.4, to give a monodispersed spherical molding sand. The resulting molding sand contained 95.3% by weight of $Al_2O_3$ and $SiO_2$ in a total amount and had an $Al_2O_3/SiO_2$ weight ratio of 2.19, $Fe_2O_3$ content of 1.21% by weight, an average particle size of 0.13 mm, a spherical degree of 0.995, and water absorption of 0% by weight.

Comparative Example 1

Figure 2:
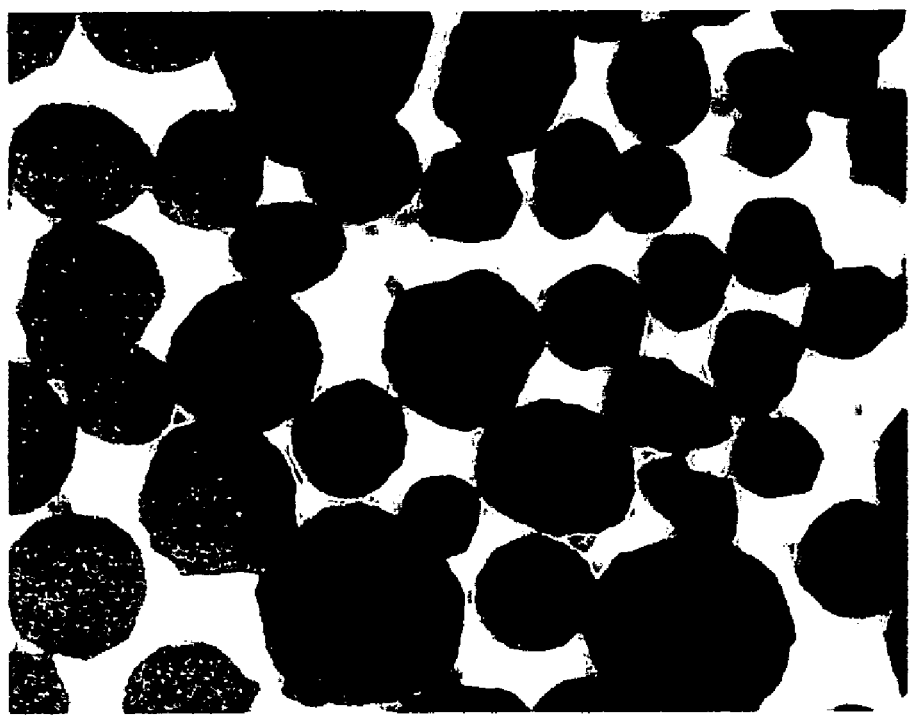
FIG. 2 is a photograph of the molding sand obtained in Comparative Example 1, taken by the reflecting microscope (magnification: 100).

Powdery particles (containing 96% by weight of $Al_2O_3$ and $SiO_2$ in a total amount), which were prepared by mixing aluminum hydroxide with kaolin so as to have an $Al_2O_3/SiO_2$ weight ratio of 2.7 and subjecting the mixture to a treatment using a spray-dryer to form spherical particles, were calcined in an electric furnace at 1500° C. for 1 hour, to give a spherical molding sand. The resulting molding sand contained 97% by weight of $Al_2O_3$ and $SiO_2$ in a total amount and had an $Al_2O_3/SiO_2$ weight ratio of 2.7, an average particle size of 0.18 mm, a spherical degree of 0.89, water absorption of 1.2% by weight, and a particle density of 2.7 g/cm$^3$. A photograph (magnification: 100) of this molding sand, taken by a reflecting microscope (commercially available from NIKON CORPORATION), is shown in FIG. 2. It can be seen from this figure that these molding sand particles have a low spherical degree and a low spherical degree.

Comparative Example 2

The same procedures as in Example 1 were carried out, except that powdery particles containing 97% by weight of $Al_2O_3$ and $SiO_2$ in a total amount and having a water content of 2.9% by weight and an average particle size of 0.2 mm, which were prepared by mixing aluminum hydroxide with kaolin so as to have an $Al_2O_3/SiO_2$ weight ratio of 25, and calcinating the mixture in an electric furnace at 700° C. for 1 hour, was used as a starting material, to give a monodispersed spherical molding sand. The resulting molding sand contained 97% by weight of $Al_2O_3$ and $SiO_2$ in a total amount and had an $Al_2O_3/SiO_2$ weight ratio of 26, an average particle size of 0.19 mm, a spherical degree of 0.88, water absorption of 1% by weight, and a particle density of 3.3 g/cm$^3$.

Comparative Example 3

The same procedures as in Example 1 were carried out, except that powdery particles containing 97% by weight of $Al_2O_3$ and $SiO_2$ in a total amount and having a water content of 0.9% by weight and an average particle size of 0.2 mm, which were prepared by mixing silicate pigment with kaolin so as to have an $Al_2O_3/SiO_2$ weight ratio of 0.5, and calcinating the mixture in an electric furnace at 700° C. for 1 hour, was used as a starting material, to give a molding sand. Most of moldings became amorphous, and moldings having a spherical form were not obtained.

Comparative Example 4

The same procedures as in Example 1 were carried out, using as a starting material a silica sand (amorphous) having an $SiO_2$ content of 99% by weight and an average particle size of 0.13 mm, to give a molding sand. The resulting molding sand was amorphous and had water absorption of 0.1% by weight.

Test Example 1

The fluidity of the molding sands obtained in Examples 1, 3 and 5 and Comparative Examples 1 and 2 was examined. Also, the strength and surface conditions of the molds obtained by using the molding sands were examined.

(1) Fluidity of Molding Sand

The fluidity time (seconds) was determined by using a funnel according to JIS K 6721. The shorter the time is, the more excellent the fluidity is.

(2) Strength of Mold

Molding sand was classified into particles having a size of 74 to 250 μm. Thereafter, 1.2 parts by weight of Kao Step S 660 (commercially available from Kao-Quaker Co., Ltd.) were added as a molding binder to 100 parts by weight of the molding sand, and the resulting mixture was molded into a mold (diameter: 50 mm×height: 50 mm) according to a self-hardening molding method. Subsequently, the mold was stored at room temperature for 24 hours, and thereafter the compressive strength (MPa) of the mold was determined (25° C., humidity: 55%).

(3) Surface Texture of Mold

The surface of a mold product after released from the mold was visually observed, and evaluated according to the following evaluation criteria. The evaluated results were used as the evaluation results for surface texture of the mold. Specifically, if the surface of a mold product is smooth, then the surface texture of the mold is smooth. A molded product was produced by fusing cast iron FC-250 in a high-frequency furnace at 1400° C., and forming it into a rectangular parallelepiped product of 50 mm×50 mm×400 mm.

[Evaluation Criteria]

○: Exhibiting smooth surface with no molding sand traces
Δ: Exhibiting slightly smooth surface with a little molding sand traces
×: Exhibiting rough surface with obvious molding sand traces The results of each test described above are shown in Table 1.

TABLE 1

|  | Ex. 1 | Ex. 3 | Ex. 5 | Comp. Ex. 1 | Comp. Ex. 2 |
|---|---|---|---|---|---|
| Molding Sand |  |  |  |  |  |
| Fluidity (sec) | 9.6 | 9.3 | 9.9 | 11.7 | 11.6 |
| Mold |  |  |  |  |  |
| Compressive Strength (MPa) | 4.9 | 5.4 | 4.4 | 2.1 | 2.9 |
| Surface Texture | ○ | ○ | ○ | X | X |

It can be seen from the results shown in Table 1 that the molding sands of Examples 1, 3 and 5 have excellent fluidity, as compared with the molding sands of Comparative Examples 1 and 2. Also, it can be seen that the casting molds obtained in Examples are excellent in strength and have smooth surface texture, as compared with those obtained in Comparative Examples. The cast products molded in the molds produced from the molding sands of Examples 1, 3 and 5 had smooth surfaces which could sufficiently reduce loads during a grinding step that is a post-treatment step.

Test Example 2

Figure 3:
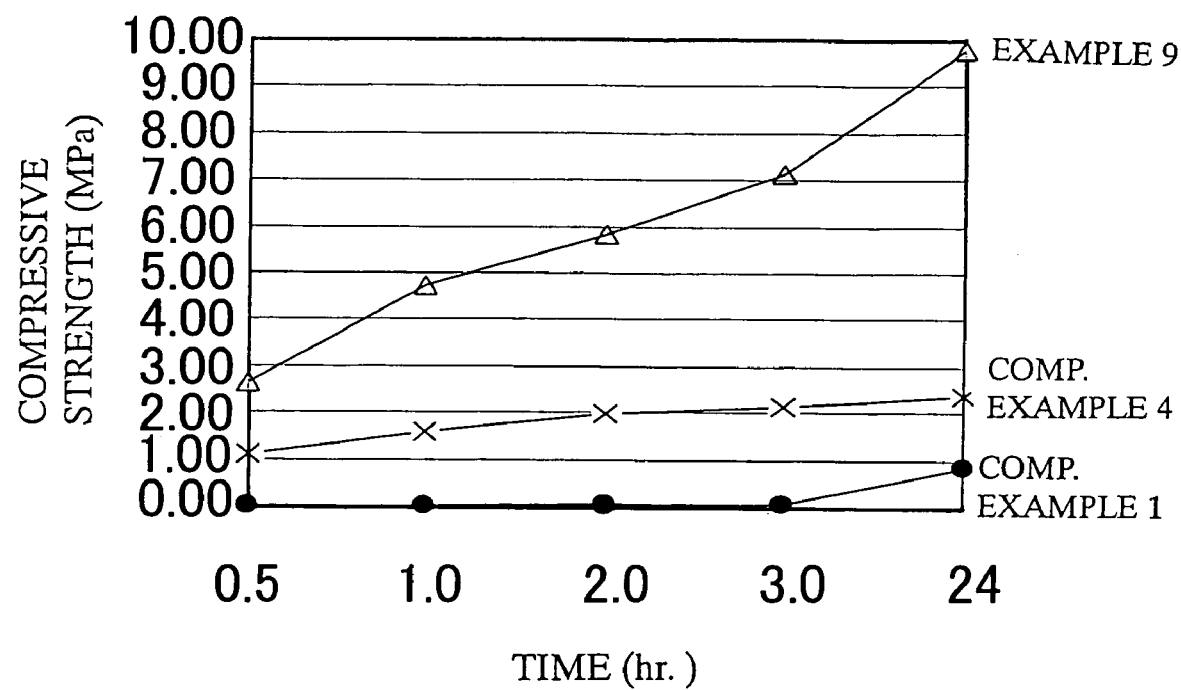
FIG. 3 is a graph showing the results of the time lapse strength test on the mold made of each of the molding sands obtained in Example 9 and Comparative Examples 1 and 4.

A strength test on casting mold was carried out in the same manner as in Test Example 1 over a period of 0.5 to 24 hours, except that molding sands obtained in Example 9 and Comparative Examples 1 and 4 were used, and Kao Lightener 34 OB (commercially available from Kao-Quaker Co., Ltd.) was used as a binder. The results of the strength test on the casting molds produced from the molding sands are shown in FIG. 3. As shown in the figure, when a molding sand of Example 9 is used, the mold strength reached a practical strength (2 MPa or so) in a short period of time. Therefore, demolding could be rapidly carried out, which improved working efficiency.

In addition, the smoothness of the surface of the casting molds produced by using the molding sands obtained in Example 9 and Comparative Example 1 and the surface of the mold product produced by using these casting molds were determined as surface roughness (center line average roughness: Ra) using a surface roughness tester (Surfcorder SE-30H, commercially available from Kosaka Kenkyusho). The smaller the Ra is, the more excellent the surface roughness is. The results are shown in Table 2. It can be seen from Table 2 that a casting mold is excellent in surface smoothness and the surface of a cast product produced by using the casting mold is also excellent in smoothness when the molding sand obtained in Example 9 is used, as compared with the molding sand obtained in Comparative Example 1.

TABLE 2

| Surface Roughness Ra (μm) | Example 9 | Comp. Example 1 |
|---|---|---|
| Casting Mold Surface | 16 | 34 |
| Cast Product Surface | 8 | 13 |

Test Example 3

The pulverization resistance, which is an indicator for regeneration efficiency of molding sand, was compared between the molding sands obtained in Examples 3 and 9 and Comparative Examples 1 and 4. One kilogram of molding sand was supplied to an alumina ball mill, and treated for 60 minutes. Thereafter, change of the average particle size [(average particle size before treatment/average particle size after treatment)×100] was used as an indicator for the pulverization resistance. The smaller the change is, the more excellent the pulverization resistance is. The results are shown in Table 3.

TABLE 3

|  | Ex. 3 | Ex. 9 | Comp. Ex. 1 | Comp. Ex. 4 |
|---|---|---|---|---|
| Change of Average Particle Size | 119 | 116 | 129 | 156 |

It can be seen from Table 3 that the molding sands of Examples 3 and 9 are excellent in pulverization resistance, as compared with the molding sands of Comparative Examples 1 and 4. Therefore, the amount of the binder to be used can be reduced, the amount of carbon remaining in the sand after use is small, and, and calcining reclamation is easy. In calcining reclamation, the molding sand is not formed into powder (but abraded powder), so that the molding sand of Examples 3 and 9 can be said to be excellent in regeneration efficiency.

Test Example 4

Molding sand composed of 50% by volume of the molding sand of Example 3 and 50% by volume of the molding sand of Comparative Example 1, and molding sand composed of 80% by volume of the molding sand of Example 9 and 20% by volume of the molding sand of Comparative Example 4 were obtained, and tested in accordance with Test Example 1. As a result, those molding sands have excellent fluidity, and the casting molds are also excellent in strength and have smooth surface.

The invention claimed is:

1. A process for producing a spherical molding sand, comprising:

fusing in flame powdery particles comprising as major components $Al_2O_3$ and $SiO_2$, and having an $Al_2O_3/SiO_2$ weight ratio of from 0.9 to 17 and an average particle size of 0.05 to 2 mm, and forming spherical particles with a water absorption of at most 0.3% by weight from said powdery particles.

2. Spherical molding sand produced by the process of claim 1, wherein the spherical molding sand comprises as major components $Al_2O_3$ and $SiO_2$, and has an $Al_2O_3/SiO2$ weight ratio of from 1 to 15 and an average particle size of 0.05 to 1.5 mm.

3. The spherical molding sand according to claim 2, wherein the spherical molding sand has an average particle size of 0.05 to 0.5 mm and a spherical degree of at least 0.95.

4. The spherical molding sand according to claim 2, wherein the spherical molding sand has a spherical degree of at least 0.98.

5. Molding sand comprising 50% by volume or more of the spherical molding sand as defined in claim 4.

6. A casting mold comprising the spherical molding sand as defined in claim 5, alone or in combination with known molding silica sand or a fire-resistant aggregate, mixed with an inorganic binder selected from the group consisting of clay, water and glass silica sol; and an organic binder selected from the group consisting of furan resin, a phenol resin and a furan-phenol resin.

7. A casting mold comprising the spherical molding sand as defined in claim 2, alone or in combination with known molding silica sand or a fire-resistant aggregate, mixed with an inorganic binder selected from the group consisting of clay, water and glass silica sol; and an organic binder selected from the group consisting of furan resin, a phenol resin and a furan-phenol resin.

8. A spherical molding sand produced by the process of claim 1, wherein the spherical molding sand comprises as major components $Al_2O_3$ and $SiO_2$, and has an $Al_2O_3/SiO_2$ weight ratio of from 1 to 15, an average particle size of 0.05 to 1.5 mm and a spherical degree of at least 0.95.

9. The spherical molding sand according to claim 8, wherein the spherical molding sand has a spherical degree of at least 0.98.

10. A molding sand comprising 50% by volume of the spherical molding sand as defined in claim 9.

11. A casting mold comprising the spherical molding sand as defined in claim 10, alone or in combination with known molding silica sand or a fire-resistant aggregate, mixed with an inorganic binder selected from the group consisting of clay, water and glass silica sol; and an organic binder selected from the group consisting of furan resin, a phenol resin and a furan-phenol resin.

12. A casting mold comprising the spherical molding sand as defined in claim 8, alone or in combination with known molding silica sand or a fire-resistant aggregate, mixed with an inorganic binder selected from the group consisting of clay, water and glass silica sol; and an organic binder selected from the group consisting of furan resin, a phenol resin and a furan-phenol resin.

* * * * *